US012433683B2

(12) United States Patent
Shmayahu et al.

(10) Patent No.: US 12,433,683 B2
(45) Date of Patent: Oct. 7, 2025

(54) TRACKING SOFT TISSUE CHANGES INTRAOPERATIVELY

(71) Applicant: Mazor Robotics Ltd., Caesarea (IL)

(72) Inventors: Yizhaq Shmayahu, Ramat HaSharon (IL); Jeetendra S. Bharadwaj, Erie, CO (US)

(73) Assignee: Mazor Robotics Ltd., Caesarea (IL)

( * ) Notice: Subject to any disclaimer, the term of this patent is extended or adjusted under 35 U.S.C. 154(b) by 611 days.

(21) Appl. No.: 17/689,617

(22) Filed: Mar. 8, 2022

(65) Prior Publication Data

US 2022/0323158 A1 Oct. 13, 2022

Related U.S. Application Data

(60) Provisional application No. 63/172,198, filed on Apr. 8, 2021.

(51) Int. Cl.
*A61B 34/20* (2016.01)
*A61B 34/30* (2016.01)

(52) U.S. Cl.
CPC .............. *A61B 34/20* (2016.02); *A61B 34/30* (2016.02); *A61B 2034/2055* (2016.02)

(58) Field of Classification Search
CPC ............ A61B 2090/3983; A61B 90/39; A61B 2562/04; A61B 2562/165; A61B 90/18; A61B 2034/2065; A61B 34/20; A61B 2090/3908; A61B 90/36; A61B 90/17; A61B 34/30; A61B 2034/254; A61B 90/37; A61B 90/361; A61B 5/683; A61B 5/251;
(Continued)

(56) References Cited

U.S. PATENT DOCUMENTS 8,311,611 B2 11/2012 Csavoy et al.
8,457,719 B2 * 6/2013 Moctezuma de la Barrera .......... A61B 34/20 606/130

(Continued)

FOREIGN PATENT DOCUMENTS

EP 1306060 5/2003
WO WO-2013188891 A2 * 12/2013 ........... G09F 21/026
WO WO 2019/071189 * 4/2020 ............. A61B 34/20

OTHER PUBLICATIONS

International Search Report and Written Opinion for International (PCT) Patent Application No. PCT/IL2022/050362, dated Aug. 17, 2022, 18 pages.

(Continued)

*Primary Examiner* — Ming Y Hon
*Assistant Examiner* — Dominique James
(74) *Attorney, Agent, or Firm* — Sheridan Ross P.C.

(57) ABSTRACT

Systems and methods for detecting motion of soft tissue are provided. An illustrative method is described to include attaching a flexible material to an object, where the flexible material includes one or more tracking markers distributed thereon and where the object includes soft tissue. The method is also disclosed to include obtaining a first image of the object that includes the one or more tracking markers in a first position, obtaining a second image of the object that includes the one or more tracking markers in a second position, and determining a motion of the soft tissue based on a comparison of the one or more tracking markers in the first position with the one or more tracking markers in the second position.

21 Claims, 6 Drawing Sheets (58) Field of Classification Search
CPC .... A61B 2034/2055; A61B 2034/2051; A61B 2034/2063; A61B 2090/3735; A61B 2090/374; A61B 2090/376; A61B 2090/3762; A61B 2090/378; A61B 2090/3782; G06T 7/0012; G06T 7/11; G06T 7/20; G06T 7/30; G06T 2207/00; A61F 2/0063; A61F 2/12; A61F 2002/3006; A61L 2400/12

See application file for complete search history.

(56) References Cited

U.S. PATENT DOCUMENTS

| | | | | |
|---|---|---|---|---|
| 9,072,343 | B1* | 7/2015 | Ogilvie | A44B 18/0023 |
| 9,436,993 | B1* | 9/2016 | Stolka | A61B 5/067 |
| 11,944,509 | B2* | 4/2024 | Hermann | A61N 5/1015 |
| 2008/0269600 | A1* | 10/2008 | Csavoy | A61B 90/17 |
| | | | | 128/898 |
| 2011/0319751 | A1 | 12/2011 | Groszmann | |
| 2013/0303887 | A1 | 11/2013 | Holsing et al. | |
| 2015/0051480 | A1* | 2/2015 | Hwang | A61B 8/5284 |
| | | | | 600/424 |
| 2017/0216628 | A1 | 8/2017 | Cvek et al. | |
| 2017/0249737 | A1* | 8/2017 | Piron | G06T 7/33 |
| 2017/0258526 | A1* | 9/2017 | Lang | A61B 17/1742 |
| 2019/0000372 | A1 | 1/2019 | Gullotti et al. | |
| 2020/0022774 | A1 | 1/2020 | Douglas et al. | |
| 2021/0393330 | A1* | 12/2021 | Barut | G06T 3/40 |

OTHER PUBLICATIONS

Official Action for European Patent Application No. 22725305.1, dated Jul. 23, 2025, 4 pages.

* cited by examiner

TRACKING SOFT TISSUE CHANGES INTRAOPERATIVELY

CROSS REFERENCE TO RELATED APPLICATIONS

This application claims priority to and the benefit of U.S. Provisional Application No. 63/172,198, filed Apr. 8, 2021, entitled "Tracking Soft Tissue Changes Intraoperatively", the entire disclosure of which is incorporated herein by reference, in its entirety, for all that it teaches and for all purposes.

FIELD

The present technology generally relates to surgical tools and procedures, and relates more particularly to surgical tools and procedures that leverage machine vision.

BACKGROUND

Surgical robots may assist a surgeon or other medical provider in carrying out a surgical procedure, or may complete one or more surgical procedures autonomously. Imaging may be used by a medical provider for diagnostic and/or therapeutic purposes. Patient anatomy can change over time, particularly during a surgical procedure.

SUMMARY

Example aspects of the present disclosure include:

A method, including:
attaching a flexible material to an object, where the flexible material includes one or more tracking markers distributed thereon and wherein the object comprises soft tissue;
obtaining a first image of the object, where the first image includes the one or more tracking markers in a first position;
obtaining a second image of the object, where the second image includes the one or more tracking markers in a second position; and
determining a motion of the soft tissue based on a comparison of the one or more tracking markers in the first position with the one or more tracking markers in the second position.

A method further including:
determining that the motion of the soft tissue exceeds a predetermined threshold; and
in response to determining that the motion of the soft tissue exceeds the predetermined threshold, reporting the soft tissue motion to at least one of a surgeon and a robot.

A method where the soft tissue motion is reported to the robot and the method further includes adjusting a robotic surgical plan based on the soft tissue motion.

A method further including:
determining a size of the object and/or a shape of the object; and
selecting the flexible material for the object based on determining the size of the object and/or the shape of the object.

A method where selecting the flexible material includes selecting a pre-formed sheet of flexible material that includes a size and/or shape that substantially accommodates the size of the object and/or the shape of the object.

A method where selecting the flexible material includes cutting a sheet of flexible material to a size and/or shape that substantially accommodates the size of the object and/or the shape of the object.

A method where attaching the flexible material includes connecting the flexible material to the object with one or more nano-hooks.

A method where attaching the flexible material includes using at least one of a staple, suture, and glue to attach the flexible material to the object.

A method further including:
obtaining at least one postoperative image of the object, wherein the at least one postoperative image of the object comprises the one or more tracking markers in a third position; and
determining a postoperative motion of the object based on a comparison of the one or more tracking markers in the third position with the one or more tracking markers in the first position and/or the second position.

A method where the one or more tracking markers include a first type of tracking marker and a second type of tracking marker.

A method where the one or more tracking markers are distributed on the flexible material in an array and/or where the array includes a subset of tracking markers having a distribution or density that is different from other tracking markers in the array.

A method where the flexible material includes a transparent or semitransparent material.

A method where the flexible material includes a bioabsorbable mesh.

A method where the flexible material includes a membrane.

A method where at least one of the first image and the second image include one or more of an ultrasound image, a magnetic resonance image, a fluoroscopic image, an infrared image, a visible light image, a radiation image, a computed tomography image, a nuclear medicine image, and/or a positron-emission tomography image.

A system, including:
an imaging device; and
a computing device, where the computing device includes:
a processor; and
computer memory coupled with the processor and having data stored therein that, when executed by the processor, enables the processor to:
obtain a first image of a soft tissue element, where the first image includes one or more tracking markers in a first position;
obtain a second image of the soft tissue element, where the second image includes the one or more tracking markers in a second position; and
determine a motion of the soft tissue element based on a comparison of the one or more tracking markers in the first position with the one or more tracking markers in the second position.

A system where the one or more tracking markers include at least one of an active fiducial and a passive fiducial.

A system where the data stored in the computer memory includes at least one of an instruction set and a neural network.

A system where the computer memory has additional data stored therein that, when executed by the processor, further enables the processor to:

modify the first image to depict the soft tissue element in a pose that corresponds to the second position of the one or more tracking markers,
where the first image is an MRI or a CT image.
A surgical system, including:
a robot configured to execute a surgical plan;
an imaging device configured to capture at least one image of a patient; and
a computing device including:
a processor; and
computer memory coupled with the processor and having data stored therein that, when executed by the processor, enables the processor to:
obtain an image of the patient during a surgical procedure, where the image includes one or more tracking markers and where the one or more tracking markers are attached to the patient with a flexible material;
analyze the image and determine a position of the one or more tracking markers;
determine, based on the position of the one or more tracking markers, that a soft tissue element of the patient has moved during the surgical procedure; and
in response to determining that the soft tissue element of the patient has moved during the surgical procedure, update the surgical plan.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer). Alternatively or additionally, one or more functions described herein can be performed using a neural network, artificial neural network, machine learning model, or the like. In other words, any component(s) described herein as corresponding to instructions could possibly be implementing using an artificial intelligence approach, entirely or partially, without departing from the scope of the present disclosure.

Instructions or neural networks may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Some processes exist for tracking changes in bony structures. However, there are few if any suitable methods established for tracking intraoperative changes to soft tissue. Embodiments of the present disclosure contemplate systems, methods, and devices to facilitate tracking changes to soft tissue using active or passive fiducials. Deployment of fiducials as described herein can enable standardization of robotic soft tissue procedures. The systems and methods described herein could be applied to any type of soft tissue tracking during any type of procedure including, without limitation, brain surgery, lung surgery, liver surgery, kidney surgery, heart surgery, spinal surgery, stomach surgery, etc. Alternatively or additionally, the systems and method described herein can be used in connection with any type of surgical robot that operates autonomously or semi-autonomously (e.g., with supervisory inputs from a user/surgeon). Moreover, embodiments of the present disclosure can be utilized in connection with manual operations (e.g., where a robot or machine is not used during surgery), but rather can be used to track movement of soft tissue and to report the movement of soft tissue to the user/surgeon, and/or to recommend changes to a surgical plan based on detected soft tissue movement.

Embodiments of the present disclosure contemplate the use of a flexible material (e.g., a thin membrane) that carries either active or passive fiducials (e.g., ultrasound fiducial, magnetic fiducials, visible fiducials, etc.) that can be temporarily or permanently attached to soft tissue, an object, and/or a moving organ. The fiducials may be located on the flexible material at known locations and possibly according to a predetermined pattern, thereby providing an ease of fiducial identification during the procedure. The layout of fiducials may also provide the ability to determine a relative position of locations of soft tissue and/or to determine coordinates of a surface contour of soft tissue relatively quickly, easily, and accurately.

In some embodiments, a flexible material may be inserted and/or attached to the soft tissue through minimally invasive procedures. When attached, patient images (e.g., MIII images, CT scans, LIDAR imaging, fluoroscopic images, etc.) can be taken with the flexible material prior to the procedure such that the fiducials are easily identifiable on the patient images. Intraoperatively, the fiducials can be recognized on real-time ultrasound scans and then can be registered with the fiducials on the patient's pre-operative images. As the soft tissue deforms, the flexible material may also deform (consistent with movement of the soft tissue), which further results in an absolute movement of the fiducials and a relative movement of two or more fiducials on the flexible material. The ultrasound scan taken during the intraoperative procedure can then show real-time locations of the fiducials, and the patient's pre-operative images (or models built from patient pre-operative images) can be morphed to reflect the locations of the fiducials and hence of the soft tissue, thereby enabling real-time tracking of the soft tissue.

Information describing movement of fiducials (absolutely or relative to one another) can be used to identify the exact location of the soft tissue at all times. The location information can then be displayed to a surgeon along with navigation information for additional guidance. Illustratively, systems and methods described herein can be used for brain shift identification during tumor resection procedures. As another illustrative example, systems and method described herein can be used to track soft tissue motion during valve placement on a moving heart. The flexible material can be removed post procedure or implanted permanently for postoperative follow up. If left in the patient, the fiducials can be analyzed in postoperative patient images to track positions of various organs, soft tissue, etc. For instance, the active fiducial can be used to check on pain scores, or to track fusion rate and/or recovery in spine procedures, or for other similar postoperative patient management.

Embodiments of the present disclosure provide technical solutions to one or more of the problems of (1) tracking soft tissue changes intraoperatively, (2) tracking soft tissue changes postoperatively, (3) reporting on soft tissue movement in real-time or within a clinically meaningful amount of time from soft tissue movement, and/or (4) controlling robotic navigation in response to soft tissue movement.

Figure 1:
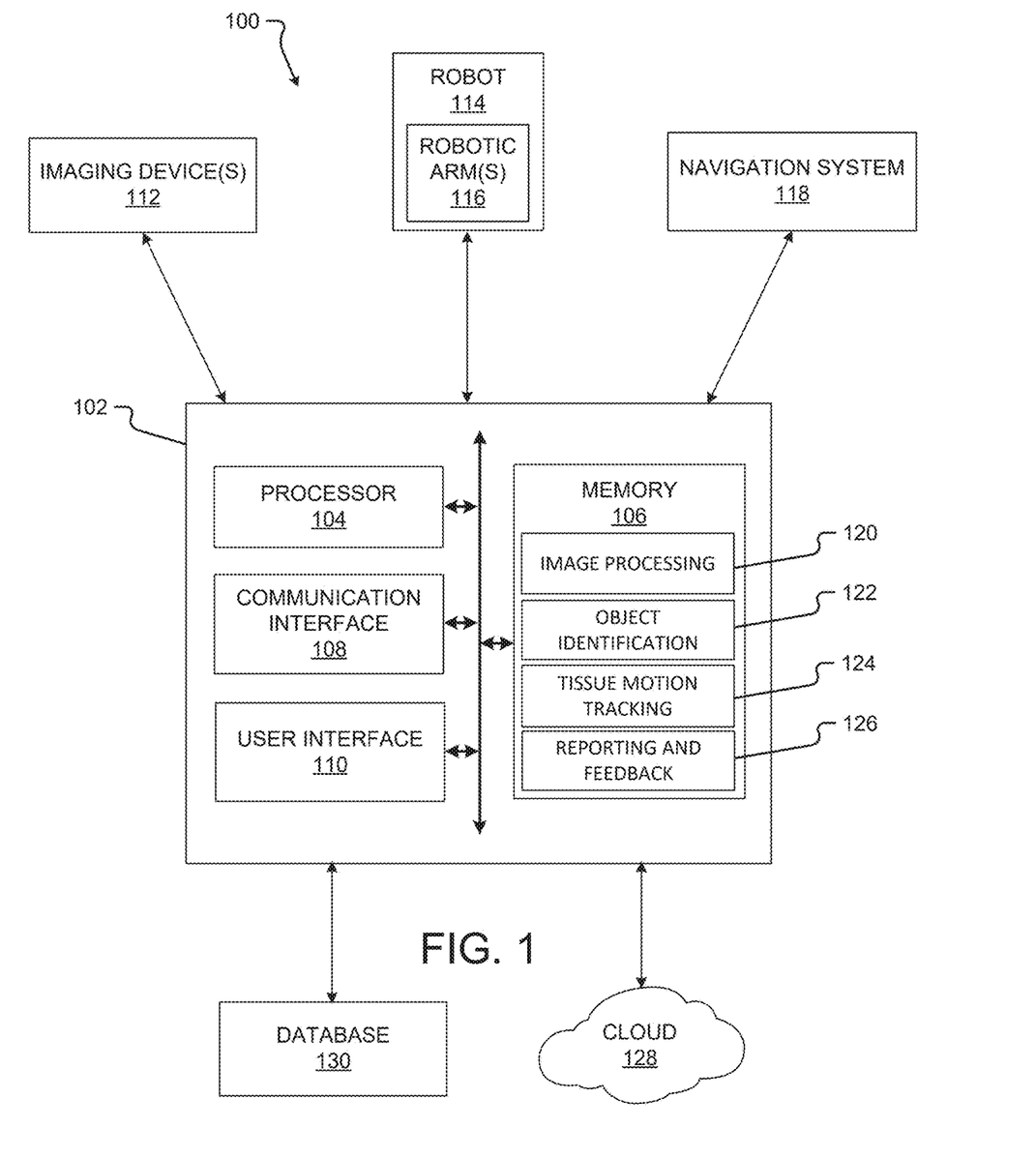
FIG. 1 is a block diagram of a system according to at least one embodiment of the present disclosure.

Turning first to FIG. 1, a block diagram of a system 100 according to at least one embodiment of the present disclosure is shown. The system 100 may be used to track soft tissue movement, assist robotic navigation in response to soft tissue movement, report on soft tissue movement, and/or carry out one or more other aspects of one or more of the methods disclosed herein. The system 100 illustratively includes a computing device 102, one or more imaging devices 112, a robot 114, a navigation system 118, a database 130, and/or a cloud or other network 128. Systems according to other embodiments of the present disclosure may comprise more or fewer components than the system 100. For example, the system 100 may not include the imaging device 112, the robot 114, the navigation system 118, one or more components of the computing device 102, the database 130, and/or the cloud 128.

The computing device 102, in some embodiments, comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions or neural networks stored in the memory 106 (e.g., data), which may cause the processor 104 to carry out one or more computing steps utilizing or based on data received from the imaging device 112, the robot 114, the navigation system 118, the database 130, and/or the cloud 128.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the methods 400, 500, 600, 700, and 800 described herein, or of any other methods. The memory 106 may store, for example, one or more image processing algorithms or neural networks 120, an object identification process 122, a tissue motion tracking process 124, and a reporting and feedback process 126. Such instructions, data, or algorithms may, in some embodiments, be organized into one or more applications, modules, packages, layers, or engines. The algorithms, data, and/or instructions may cause the processor 104 to manipulate data stored in the memory 106 and/or received from or via the imaging device 112, the robot 114, the database 130, and/or the cloud 128.

Illustratively, the memory 106 is shown to include image processing instructions 120, object identification instructions 122, tissue motion tracking instructions 124, and reporting/feedback instructions 126. Again, one or more of the instructions may be implemented as a neural network, artificial neural network, or machine learning model without departing from the scope of the present disclosure.

The image processing 120, when executed by the processor 104, may enable the computing device 102 to cooperate with the imaging device(s) 112, robot 114, and/or navigation system 118 to obtain and use patient images. In some embodiments, the image processing 120 may be configured to receive patient images (e.g., preoperative patient images, intraoperative patient images, and/or postoperative patient images), receive object images, receive environmental images (e.g., images of a surgical room) and prepare the images for processing by other components of the computing device 102. Illustratively, the image processing 120 may be configured to receive images and format such images for consumption by the object identification 122 and/or tissue motion tracking 124. In some embodiments, the image processing 120 may be configured to transform an image or image data into a different consumable format by converting the image from one digital format to another digital format, by performing pixel analysis to determine locations of objects, by identifying locations of fiducials in an image, by compressing an image, by decompressing an image, by overlaying object models on an image, and/or any other task associated with preparing an image for consumption by the object identification 122 and/or tissue motion tracking 124.

The object identification 122, when executed by the processor 104, may enable the computing device 102 to identify one or more objects in an image, identify a pose (e.g., position and/or orientation) of objects in an image and in space, identify a pose of an object relative to another object, identify a pose of objects by analyzing locations of one or more fiducials, identify patient anatomy from pixel and/or gradient analysis of images, identify a pose of non-patient objects (e.g., a robotic arm 116) relative to a patient object (e.g., an organ, nerve, muscle, bone, etc.), label objects within an image, and any other combination of tasks associated with identifying an object, locating an object, and/or differentiating one object from another object.

The tissue motion tracking 124, when executed by the processor 104, may enable the computing device 102 to track a motion of one or more objects within a field of view of an imaging device 112. In some embodiments, the tissue motion tracking 124 may be configured to identify one or more objects of interest and track a motion of the object(s) of interest intraoperatively and/or postoperatively. The tissue motion tracking 124 may be configured to track an absolute motion of one or more objects (e.g., by identifying a movement of the object in space or relative to a fixed coordinate system) and/or track a motion of one object relative to another object. The tissue motion tracking 124 may be configured to locate and track object(s) by identifying object(s) in an image via pixel analysis and then monitoring a movement of the object(s) based on an analysis of subsequent images. The tissue motion tracking 124 may be configured to track a position and/or motion of tissue (e.g., soft tissue) by identifying and tracking a location of fiducials in one or more images. As will be described herein, if a positional relationship is established between an object and one or more fiducials, then the tissue motion tracking 124 may be configured to correlate a motion of one or more fiducials to a motion of one or more objects, where the objects may include soft tissue objects such as an organ, nerve, muscle, tumor growth, skin, etc.

The reporting and feedback 126, when executed by the processor 104, may enable the computing device 102 to provide information related to object identification and/or object motion to a user of the computing device 102. Alternatively or additionally, the reporting and feedback 126 may also be configured to provide feedback to the navigation system 118 to assist with the navigation of the robot 114. As an example, the reporting and feedback 126 may provide the navigation system 118 and/or a surgeon with information related to object motion, soft tissue motion, fiducial motion, or combinations thereof. The reporting and feedback 126 may alternatively or additionally provide one or more alerts if an object or multiple objects are determined to have moved (absolutely or relatively) beyond a predetermined movement threshold. In the event that motion of an object or multiple objects exceeds the predetermined movement threshold (e.g., a predetermined distance) or two objects move too close to one another, the reporting and feedback 126 may issue an alert or cause the navigation system 118 to update a navigation plan for the robot 114. Updated navigation plans prepared in response to detecting soft tissue movement may allow the robot 114 to avoid cutting, puncturing, or otherwise damaging an object comprising soft tissue during a surgical procedure.

The computing device 102 may also comprise a communication interface 108. The communication interface 108 may be used for receiving image data or other information from an external source (such as the imaging device 112, the robot 114, the navigation system 118, the database 130, the cloud 128, and/or any other system or component not part of the system 100), and/or for transmitting instructions, images, or other information to an external system or device (e.g., another computing device 102, the imaging device 112, the robot 114, the navigation system 118, the database 130, the cloud 128, and/or any other system or component not part of the system 100). The communication interface 108 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computer device 102. Illustratively, the user interface 110 may include a user input device, a user output device, and a combination user input/user output device (e.g., a touch-sensitive display device).

The imaging device 112 may be operable to image anatomical feature(s) (e.g., a bone, veins, soft tissue, etc.) and/or other aspects of patient anatomy to yield image data (e.g., image data depicting or corresponding to a bone, veins, soft tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MM) scanner, an ultrasound imaging device, an optical coherence tomography (OCT) scanner, an endoscope, a microscope, an optical camera, a thermographic camera (e.g., an infrared camera), a radar or LIDAR system (which may comprise, for example, a transmitter, a receiver, a processor, and one or more antennae), or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm (as well as any object or element held by or secured to the robotic arm).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (e.g., a pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

Figure 4:
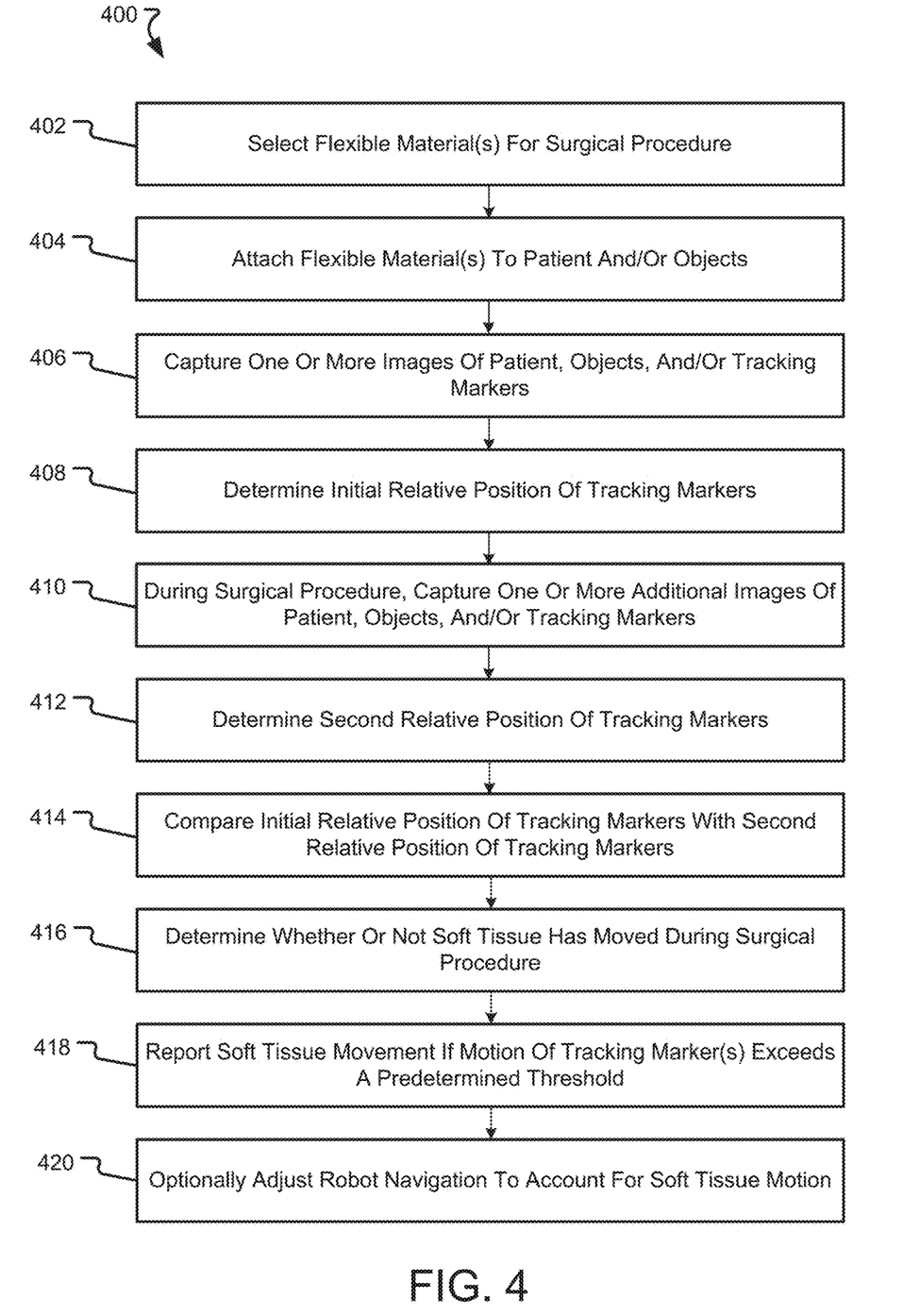
FIG. 4 is a flow diagram illustrating a surgical method according to at least one embodiment of the present disclosure.

The system 100 or similar systems may be used, for example, to carry out one or more aspects of any of the methods 400, 500, 600, 700, and/or 800 described herein. The system 100 or similar systems may also be used for other purposes. Any of the methods depicted and described herein may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform a method (e.g., method 400) by executing instructions stored in a memory such as the memory 106.

Referring now to FIGS. 2A thru 3B, additional details of fiducials and other markers to be used in tracking soft tissue motion will be described in accordance with at least some embodiments of the present disclosure. One or more tracking markers 202 may be provided on a flexible material 204 and the flexible material 204 may be configured for attachment to an object or patient 300 (e.g., on an organ or other soft tissue of the patient) to assist with the tracking of soft tissue motion intraoperatively and/or postoperatively. In some embodiments, a flexible material 204 may include an array of markers 200 provided thereon, where each tracking marker 202 in the array of markers 200 is distributed in a known pattern across the flexible material 204. In some embodiments, the tracking markers 202 may be distributed substantially evenly in the array of markers 200 such that the tracking markers 202 are distributed in a row/column format. Such a distribution of tracking markers 202 is not required, however. In some embodiments, the flexible material 204 may be provided with a plurality of tracking markers 202 that are not necessarily distributed in an array format, but rather are distributed randomly or pseudo randomly. In some embodiments, the tracking markers may be distributed in a unique pattern that facilitates determination of an orientation of the array of markers 200.

Figure 3A:
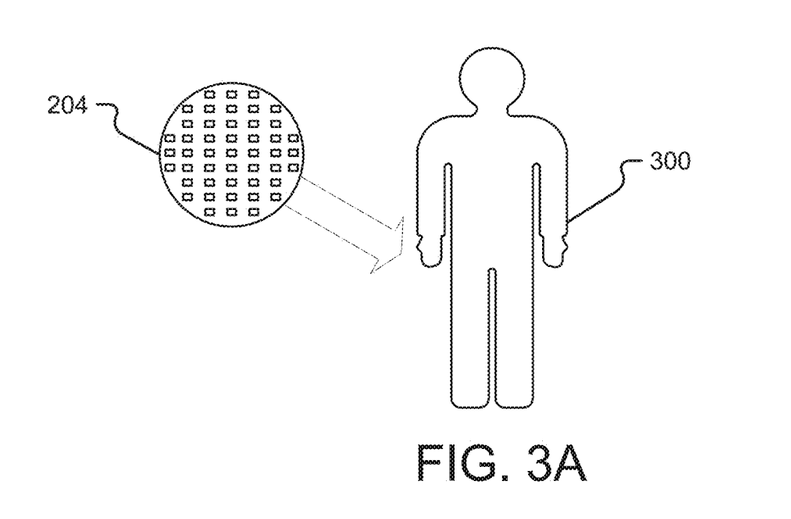
FIG. 3A illustrates a first configuration of a flexible material with respect to a patient according to at least one embodiment of the present disclosure.
Figure 3B:
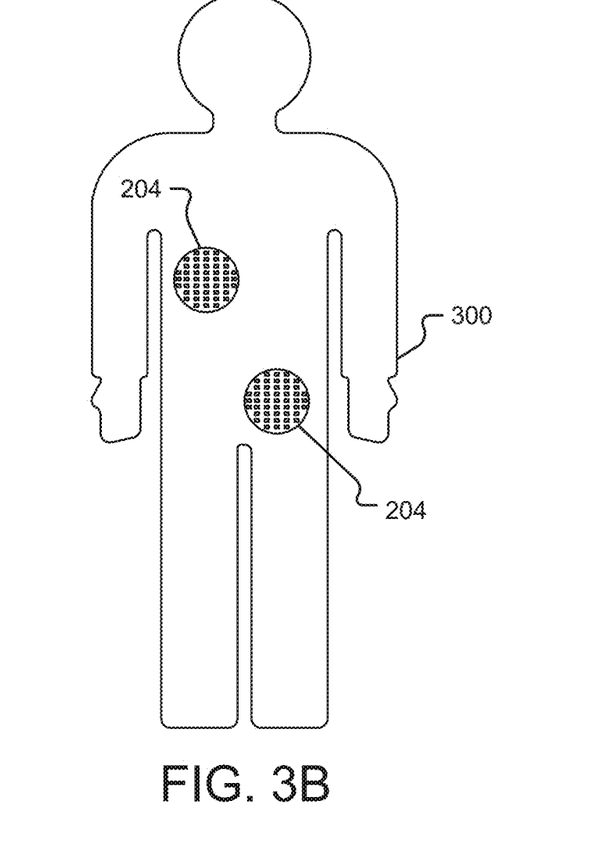
FIG. 3B illustrates a second configuration of a patient having more than one patches of flexible material applied thereto according to at least one embodiment of the present disclosure.

In some embodiments, the tracking markers 202 may be integrated into the flexible material 204 or affixed to the flexible material 204 such that motion of the flexible material 204 translates to a motion of the tracking markers 202. Illustratively, but without limitation, the flexible material 204 may be configured for attachment to a patient 300 or an object of interest (e.g., a soft tissue element belonging to a patient 300 such as an organ, nerve, muscle, tumor growth, skin, bone, etc.). As shown in FIG. 3B, multiple patches of flexible material 204 may be attached to a patient 300 or one or more anatomical elements of a patient 300. With the flexible material 204 attached to the patient 300 or object of a patient 300, the object identification 122 and/or tissue motion tracking 124 of the computing device 102 may be configured to identify and track motion of soft tissue elements belonging to a patient 300 intraoperatively and/or postoperatively. Specifically, but without limitation, because the flexible material 204 may include one or more tracking markers 202, the position and motion of tracking markers 202 can be correlated to a motion of the flexible material 204, which is correlated to a motion of an object to which the flexible material 204 is attached.

The flexible material 204 may be attached or connected to a patient 300 or object of a patient 300 in a number of ways. In some embodiments, attachment mechanisms (e.g., connectors, staples, sutures, glue, etc.) may be used to attach the flexible material 304 to the patient 300 or anatomical element of the patient 300. In some embodiments, the flexible material 204 may be provided with integrated attachment mechanisms, which enable the flexible material 204 to releasably connect with or attach to the patient 300 or anatomical element of the patient 300. For example, the flexible material 204 may be provided with a plurality of nano-hooks on one or both sides of the flexible material 204. The side of the flexible material 204 having the nano-hooks (e.g., a patient side of the material) may be pressed into a soft tissue element of the patient 300 to attach the flexible material 204 to the patient 300 or anatomical element of the patient 300. If a relatively large amount of motion is expected of an object during a surgical procedure, then the flexible material 204 may be connected to the object with a stronger attachment mechanism (e.g., staples, sutures, glue, etc.).

In some embodiments, the flexible material 204 may be provided as a mesh that is configured to wrap around (e.g., conform its shape to) an object. As an example, the flexible material 204 may correspond to a mesh or film that is configured to wrap around an object and accept a shape of the object once attached thereto. The flexible material 204 may correspond to a membrane that connects to a soft tissue element of a patient 300. The flexible material 204 may be attachable to a nerve, spinal cord, stent, or blood vessel that should not be cut during a surgical procedure. In this way, the flexible material 204 may be used to track an object that should not be cut or move in response to contact by the robot 114. Alternatively or additionally, the flexible material 204 may be attachable to an object that should be cut during a surgical procedure. Examples of such objects include, without limitation, tumors, growths, organs, foreign objects (e.g., non-human objects), etc. Although the present disclosure is directed primarily to the tracking of soft tissue, embodiments hereof may additionally or alternatively be used to track hard tissue as well, including by attaching a flexible material 204 comprising an array of markers 200 to a bone or other hard tissue of a patient.

The flexible material 204 may be configured for removal from the patient 300 when the surgical procedure is complete or the flexible material 204 may be configured to be left in the patient 300 postoperatively. In some embodiments, the flexible material 204 may include a bioabsorbable mesh that is configured to dissolve after being left in the patient 300 for more than a predetermined amount of time. In some embodiments, the flexible material 204 may include an optically transparent or semitransparent material that does not obstruct a view of an object to which the flexible material 204 is attached. In some embodiments, the flexible material 204 may be configured to be cut during surgery, but the cut flexible material 204 still retains some degree of attachment to the object when the flexible material 204 and object are cut at the same time.

The tracking markers 202 may correspond to active and/or passive fiducials. In some embodiments, the tracking markers 202 in an array of markers 200 may all be of the same type. In some embodiments, the array of markers 200 may include tracking markers 202 of different types. In some embodiments, the array of markers 200 may include a first type of tracking markers 202 and a second type of tracking markers 202. Tracking markers 202 may vary according to whether they are active or inactive, whether they respond to certain imaging techniques (e.g., ultrasound, magnetic resonance, radiation, LIDAR, etc.). As an example, some tracking markers 202 may respond to one imaging technique such as ultrasound imaging better than other tracking markers 202, which respond better to a different imaging technique such as magnetic resonance imaging or fluoroscopic imaging. The tracking markers 202 may correspond to fiducials that are relatively small in size (e.g., between 2 mm and 4 mm) so that they are visible to the human eye, but do not hinder a visualization of the object to which the flexible material 204 is connected. A space between adjacent tracking markers 202 may be larger than a size of the tracking markers 202, but such a configuration is not required.

Where active tracking markers are used for the tracking markers 202, any given tracking marker 202 may be configured to pulse at a predetermined unique (relative to other tracking markers 202 in the array of markers 200) or semi-unique frequency, to emit ultrasonic waves or other energy at a predetermined unique or semi-unique wavelength, or to otherwise have one or more characteristics that enable any the tracking marker 202 to be distinguishable from one or more other tracking markers 202 in the array of markers 200. Use of one or more distinguishable tracking markers 202 may facilitate determination of a pose of the array of markers 200 and thus of the object to which the array of markers 200 is attached.

Any one of the tracking markers 202 may be identified and registered by the object identification 122 and/or tissue motion tracking 124 of the computing device 102 to help with the identification of objects and tracking of motion of objects during and/or after a surgical procedure. In some embodiments, each of the tracking markers 202 may be specifically identified once attached to the patient 300 or anatomical element of the patient 300. After identification and registration of the tracking markers 202, the tissue motion tracking 124 may be configured to specifically monitor a position and movement of each individual tracking markers 202 during the surgical procedure. The monitoring may occur continuously or periodically during the surgical procedure to track a motion of soft tissue elements and to help ensure that a navigation and/or surgical plan is followed and/or determine whether a navigation and/or surgical plan should be adjusted.

Figure 2A:
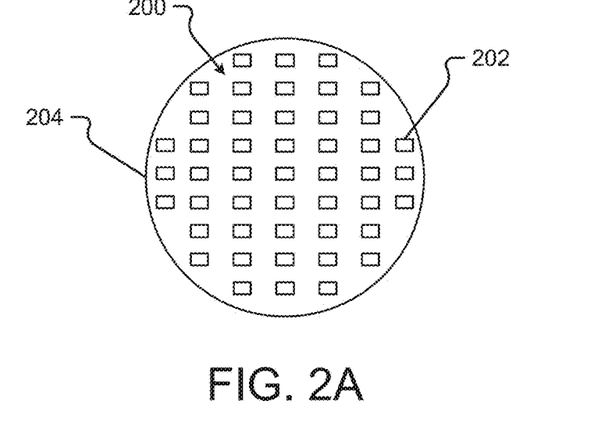
FIG. 2A illustrates one example of an array of markers provided on a flexible material according to at least one embodiment of the present disclosure.
Figure 2B:
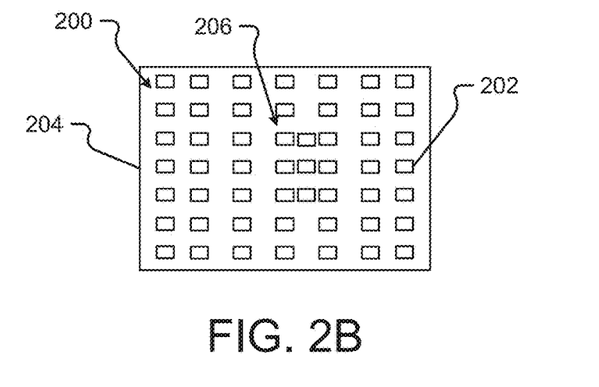
FIG. 2B illustrates another example of an array of markers provided on a flexible material according to at least one embodiment of the present disclosure.
Figure 2C:
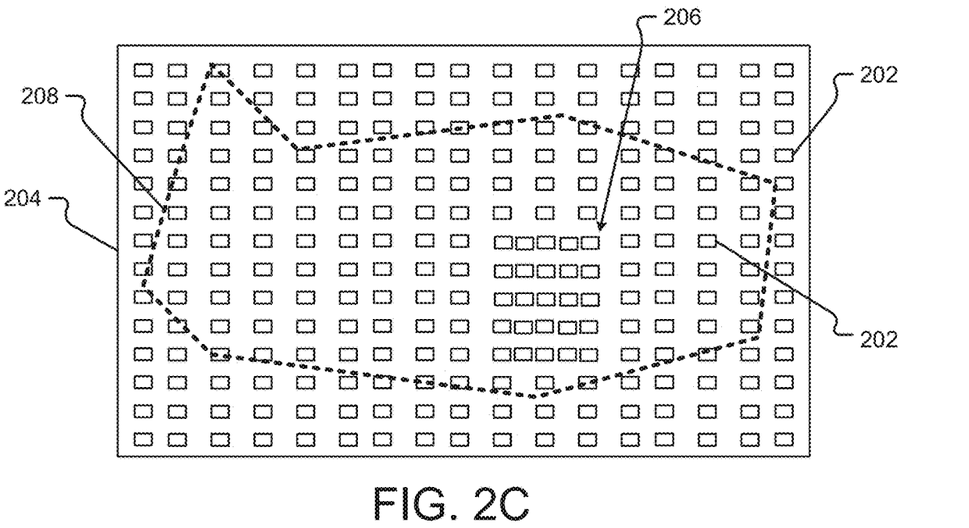
FIG. 2C illustrates another example of an array of markers provided on a flexible material according to at least one embodiment of the present disclosure.

As shown in FIGS. 2B and 2C, the array of markers 200 may include a number of tracking markers 202 distributed in one pattern and with one density, but a subset of markers 206 may be distributed in a different pattern or different density from the rest of the tracking markers 202 in the array of markers 200. In some embodiments, the subset of markers 206 having the different distribution and/or density may be overlaid on a particular area of interest, possibly providing more tracking markers 202 in the area of interest. More tracking markers 202 in an area may help identify smaller motions of soft tissue. In other words, the number of tracking markers 202 provided in an area may be adjusted if one area is of more or less interest than another area during a surgical procedure. As a non-limiting example, the subset of markers 206 having a different distribution may be attached to a portion of a soft tissue element that is intended to be extracted or cut during surgery (e.g., along dashed lines 208) whereas other areas that are not intended to be extracted to cut during surgery may not have the subset of markers 206 attached thereto. As another non-limiting example, the subset of markers 206 having a different distribution may be attached to a portion of a soft tissue element that is most critical to avoid cutting and/or to otherwise protect from damage during a surgical procedure, while other areas that are less critical may not have the subset of markers 206 attached thereto.

The tracking markers 202 in the subset of markers 206 may be the same as or different from other tracking markers 202 in the array of markers 200. As an example, the tracking markers 202 in the subset of markers 206 may correspond to tracking markers 202 of a first type (e.g., active, ultrasound, MRI, LIDAR, etc.) whereas tracking markers 202 not in the subset of markers 206 may correspond to tracking markers 202 of a second type (e.g., passive, ultrasound, MRI, LIDAR, etc.).

FIGS. 2A through 2C illustrate that the flexible material 204 may be provided in a number of different form factors. For instance, the flexible material 204 may be provided in a pre-cut shape or configuration, such as a patch having a predetermined area/size. In other configurations, the flexible material 204 may be configured for customization such that a surgeon can cut the flexible material 204 during surgery to a preferred shape and size. FIG. 2C illustrates an example of a flexible material 204 being cut along a separation line 206 such that some tracking markers 202 are captured inside the separation line 206 whereas other tracking markers 202 are left outside the separation line 206. Once cut, the customized flexible material 204 may be attached to a patient 300 or object of a patient 300. It should be appreciated that a combination of pre-cut and custom-formed patches of flexible material 204 may be used during a surgical procedure. One or more of the patches of flexible material 204 may be left in the patient 300 postoperatively while other patches of flexible material 204 may be removed from the patient 300.

With reference now to FIGS. 4-8, various methods will be described in accordance with at least some embodiments of the present disclosure. It should be appreciated that the methods and/or method steps can be performed in any order and may executed by any one or combination of components depicted and described with reference to system 100. Furthermore the steps of one method can be combined, in any order, with steps of any other method without departing from the scope of the present disclosure.

Referring initially to FIG. 4, a surgical method 400 will be described according to at least one embodiment of the present disclosure. The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing data stored in a memory such as the memory 106. The data (e.g., instructions or neural networks) may cause the processor to execute one or more of the image processing 120, object identification 122, tissue motion tracking 124, and/or reporting and feedback 126.

The method 400 begins by selecting one or more flexible materials 204 for use during a surgical procedure (step 402). The selected flexible materials 204 may be of the same or different types (e.g., pre-cut, custom-cut, mesh, film, membrane, etc.). The selected flexible material(s) 204 may include one or many tracking markers 202 of the same or different types. In some embodiments, the flexible material(s) 204 may be selected based on an object to which the flexible material 204 will be attached. For example, the size, shape, or type of object to which the flexible material 204 will be attached may determine the type of flexible material 204 selected for the object. The flexible material 204 may also be selected based on the type(s) of tracking markers 202 provided thereon and/or whether or not the object associated with the flexible material 204 is intended to be cut or not during surgery.

The method 400 may continue by attaching the flexible material(s) 204 to the patient 300 and/or anatomical element of the patient 300 (step 404). As can be appreciated, the flexible material(s) 204 may be attached to one or multiple objects and may be configured to conform to the shape of the object(s) once attached thereto. The attachment mechanism(s) used to attach the flexible material(s) 204 to an object may depend upon the expected amount of motion the object will undergo during surgery. For instance, if the object is not expected to move significantly (e.g., less than a few centimeters or millimeters) during surgery, then a first type of attachment mechanism may be used (e.g., nano-hooks) whereas if the object is expected to move significantly (e.g., more than a few centimeters or millimeters) during surgery, then a second type of attachment mechanisms may be used (e.g., staples, sutures, glue, etc.). The flexible material(s) 204 may be attached during a minimally invasive procedure, or during an open procedure. The flexible material(s) 204 may be attached prior to commencing a surgical plan that includes monitoring a pose of soft tissue while one or more other surgical steps are completed. In some embodiments, the flexible material(s) 204 may be attached intraoperatively, but before soft tissue movement monitoring is needed.

The method 400 may then continue by capturing one or more images of the patient 300, objects of the patient 300, and/or tracking markers 202 (step 406). The images may include any type of image or image data generated with machine vision techniques. Non-limiting examples of imaging techniques that may be used to capture the one or more images include ultrasound imaging, magnetic resonance imaging, fluoroscopic imaging, infrared imaging, visible light imaging, radiation imaging, computed tomography imaging, nuclear medicine imaging, positron-emission tomography, combinations thereof, and the like. The images may include preoperative images, in which case the images may not necessarily include the tracking markers 202 (if, for example, the flexible material(s) 204 have not yet been attached to the patient). The images may include intraoperative images, which may or may not include tracking markers 202. The images may include postoperative images, which may or may not include tracking markers 202. In some embodiments, the images may be received directly from an imaging device 112 or from a computer device that stored an electronic copy of the image. The image(s) received in step 406 may include pixel-based images and/or model-based images. In some embodiments, the step 406 may comprise generating a two-dimensional or three-dimensional model from one or more images captured during the step 406, using known model generation techniques.

Where the image(s) captured in the step 406 do(es) include the tracking markers 202, the method 400 may then continue with the processor 104 executing the object identification 122 and/or tissue motion tracking 124 to determine an initial relative position of the tracking markers 202 (step 408). The initial relative position of the tracking markers 202 may be used to determine an initial position (absolute or relative) of one or more objects in the image. The position may be determined relative to other objects, relative to an arbitrary coordinate origin, or combinations thereof.

The method 400 may then include capturing one or more additional images of the patient 300, of the anatomical element of the patient 300, and/or of the tracking markers 202 during the surgical procedure (step 410). The image(s) captured intraoperatively may utilize the same or different type of imaging technique as was used to capture images in step 406. The image(s) may correspond to still images and/or video images. The image(s) may be captured continuously during the surgical procedure or periodically (e.g., according to predetermined intervals). Where the one or more additional images captured in the step 410 include the tracking markers 202, the step 410 may comprise registering the tracking markers 202 as depicted in the one or more additional images to the tracking markers 202 as depicted in the one or more images captured during the step 406. Thus, for example, if the step 406 yields one or more MRI or CT images, and the step 410 yields one or more ultrasound images, then the tracking markers 202 as depicted in the ultrasound images may be registered to the tracking markers 202 in the MRI or CT images. The MM or CT images may then be updated to reflect any detected movement of the object(s) of the patient 300 that is/are being tracked using the tracking markers 202, based on a detected position and/or orientation of the tracking markers 202 in any further images captured during the surgical procedure.

The method 400 may then continue with the processor 104 executing the object identification 122 and/or tissue motion tracking 124 to determine a second position of the tracking markers 202 (step 412). The second position may correspond to an absolute position in space or a position relative to at least one other object or adjacent tracking markers 202. In some embodiments, a motion of a soft tissue element having a flexible material 204 attached thereto may result in one or more tracking markers 202 moving from a first position to a second position between images. The second position of tracking markers 202 may be compared to previous positions of the same tracking markers 202 and/or to current position(s) of other tracking markers 202 (step 414) to determine whether or not the soft tissue element has moved during the surgical procedure (step 416). The processor 104 may execute the object identification 122 and/or tissue motion tracking 124 to perform steps 414 and/or 416.

If the tissue motion tracking 124 determines that the soft tissue element has moved more than a predetermined threshold, then the tissue motion tracking 124 may invoke the reporting and feedback 126 to report soft tissue movement (step 418). In some embodiments, the soft tissue movement may be reported to a motion controller of the robot 114 and/or to a surgeon operating the robot 144. Accordingly, feedback generated in step 418 may include electronic feedback for a motion controller and/or audible/visible feedback for a human user. In some embodiments, the feedback generated in step 418 may be used to optionally adjust a manual or robotic navigation and/or surgical plan that accounts for the soft tissue motion (step 420). The adjustment to the navigation plan may include adjustments to avoid cutting the soft tissue after movement, ensure cutting the soft tissue after movement, or combinations thereof. The feedback generated in the step 418 may additionally or alternatively comprise a recommended modification to a navigation and/or surgical plan, which recommended modification may be generated automatically.

The present disclosure encompasses embodiments of the method 400 that comprise more or fewer steps than those described above, and/or one or more steps that are different than the steps described above.

Figure 5:
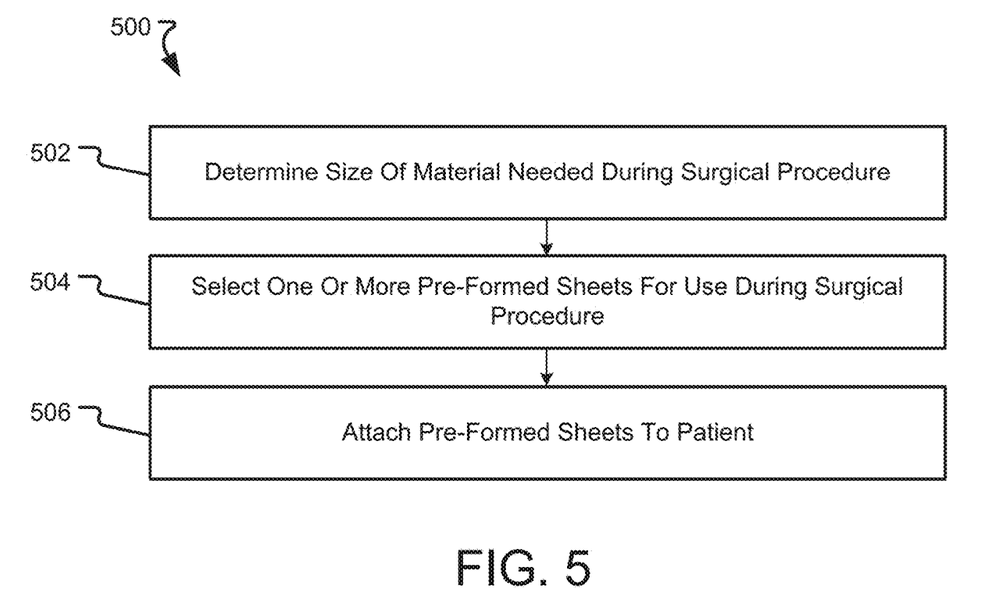
FIG. 5 is a flow diagram illustrating a method of using one or more pre-formed sheets of flexible material during a surgical procedure according to at least one embodiment of the present disclosure.

With reference now to FIG. 5, a method 500 of using one or more pre-formed sheets of flexible material 204 during a surgical procedure will be described according to at least one embodiment of the present disclosure. The method 500 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 500. The at least one processor may perform the method 500 by executing data stored in a memory such as the memory 106. The data (e.g., instructions or neural networks) may cause the processor to execute one or more of the image processing 120, object identification 122, tissue motion tracking 124, and/or reporting and feedback 126.

The method 500 begins by determining a size of flexible material 204 needed during a surgical procedure (step 502). The determination may be made by a surgeon or the robot 114 and may be based upon a size of an object to which the flexible material 204 will be attached (e.g., as reflected in a surgical plan).

The method 500 may continue by selecting one or more pre-formed sheets of flexible material 204 for use during the surgical procedure (step 504). The selection of pre-formed sheets of flexible material 204 may be based upon the determine size and/or shape of the object 204 to which the flexible material 204 is being attached. In some embodiments, the selection of the pre-formed sheets 204 may also include selecting a pre-formed sheet 204 that has an appropriately sized subset of markers 206 to cover a desired area. For example, during surgery it may be possible to determine a size of an object to be removed during surgery or an object not to be cut during surgery. It may also be possible to determine a size of an area of interest on the object and the pre-formed sheet of flexible material 204 may be selected based on its array of markers 200 and the size of a subset of markers 206 that conforms to the size of the area of interest.

The selected pre-formed sheets of flexible material 204 may then be attached to the patient 300 or an anatomical element of the patient 300 (step 506). As mentioned above, the attachment mechanisms selected in this step may vary depending upon the nature of the object, whether the object is being removed during surgery or not, whether the object is to be cut during surgery or not, an expected motion of the object, whether the sheets will be left within the patient 300 following the surgical procedure, and/or other factors.

The present disclosure encompasses embodiments of the method 500 that comprise more or fewer steps than those described above, and/or one or more steps that are different than the steps described above.

Figure 6:
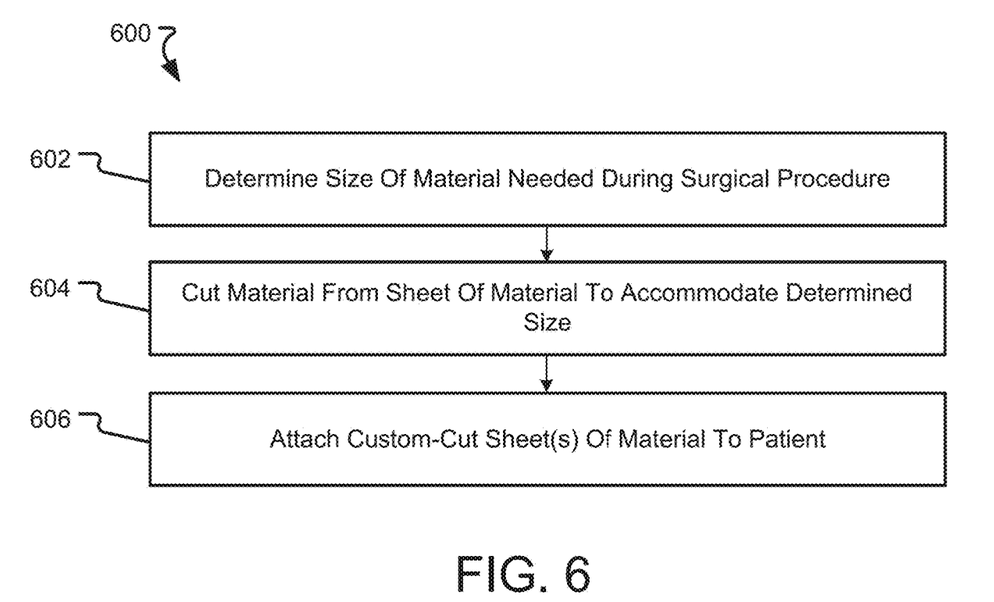
FIG. 6 is a flow diagram illustrating a method of using one or more custom-cut sheets of flexible material during a surgical procedure according to at least one embodiment of the present disclosure.

With reference now to FIG. 6, a method 600 of using one or more custom-cut sheets of flexible material 204 during a surgical procedure will be described according to at least one embodiment of the present disclosure. The method 600 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 600. The at least one processor may perform the method 600 by executing data stored in a memory such as the memory 106. The data (e.g., instructions or neural networks) may cause the processor to execute one or more of the image processing 120, object identification 122, tissue motion tracking 124, and/or reporting and feedback 126.

The method 600 begins by determining a size of flexible material 204 needed during a surgical procedure (step 602). This step may be similar or identical to step 502. The determination may be made by a surgeon or the robot 114 and may be based upon a size of an object to which the flexible material 204 will be attached (e.g., as reflected in a surgical plan).

The method 600 may continue by cutting a sheet of flexible material 204 to create a separation line 206 that forms the sheet of flexible material 204 to the size and shape determined in step 602 (step 604). The size and shape of the cut made in the flexible material 204 may be based upon the determined size and/or shape of the object 204 to which the flexible material 204 is being attached. The flexible material 204 may also be cut in a manner sufficient to overlay a subset of markers 206 onto an area of interest of the object to which the flexible material 204 is being attached.

The custom-cut sheet(s) of flexible material 204 may then be attached to the patient 300 or an anatomical element of the patient 300 (step 606). As mentioned above, the attachment mechanisms selected in this step may vary depending upon the nature of the object, whether the object is being removed during surgery or not, whether the object is to be cut during surgery or not, an expected motion of the object, whether the sheets will be left within the patient 300 following the surgical procedure, and/or other factors.

The present disclosure encompasses embodiments of the method 600 that comprise more or fewer steps than those described above, and/or one or more steps that are different than the steps described above.

Figure 7:
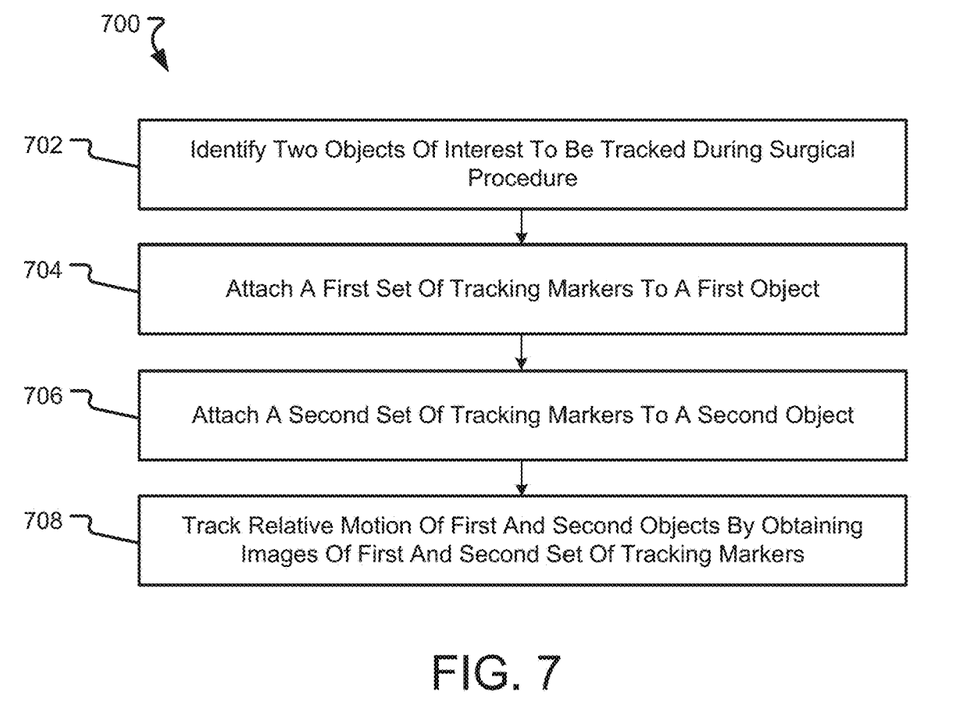
FIG. 7 is a flow diagram illustrating a method of tracking a relative motion of objects according to at least one embodiment of the present disclosure.

With reference now to FIG. 7, a method 700 of tracking a relative motion of objects will be described according to at least one embodiment of the present disclosure. The method 700 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 700. The at least one processor may perform the method 700 by executing data stored in a memory such as the memory 106. The data (e.g., instructions or neural networks) may cause the processor to execute one or more of the image processing 120, object identification 122, tissue motion tracking 124, and/or reporting and feedback 126.

The method 700 begins by identifying two objects of interest to be tracked during a surgical procedure (step 702). The objects identified in step 702 may be identified by a surgeon and/or by a robot 114. This step may alternatively or additionally include identifying two different areas of a common object to be tracked during the surgical procedure and treating each area of the common object as "different objects" during the surgical procedure.

The method 700 continues by attaching a first set of tracking markers 202 to the first object (step 704). The first set of tracking markers 202 may be provided on a first flexible material 204 and may be attached to the first object using any suitable type of attachment mechanism. The manner in which the first set of tracking markers 202 is attached to the first object may depend upon the size, shape, nature, and/or expected motion of the first object, and/or any other factor described herein. The attachment mechanisms may also be selected based on the nature of the flexible material 204 on which the first set of tracking markers 202 are provided.

The method 700 may also include attaching a second set of tracking markers 202 to the second object (step 706). The second set of tracking markers 202 may be provided on a second flexible material 204 and may be attached to the second object using any suitable type of attachment mechanism. The manner in which the second set of tracking markers 202 is attached to the second object may depend upon the size, shape, nature, and/or expected motion of the second object, and/or any other factor described herein. The attachment mechanisms may also be selected based on the nature of the flexible material 204 on which the second set of tracking markers 202 are provided.

The method 700 may then continue by tracking a relative motion of the first object and the second object by obtaining images of the first set of tracking markers 202 and the second set of tracking markers 202 (step 708). The position(s) of the tracking markers 202 may be compared from image to image to determine whether the first object is moving relative to the second object.

While examples of the first object and the second object have been described where both objects include soft tissue, it should be appreciated that one or both of the objects may not include soft tissue, but rather may be formed of a less malleable or deformable material. The objects and the relative motion thereof may still be tracked using two or more sets of tracking markers 202 without departing from the scope of the present disclosure.

The present disclosure encompasses embodiments of the method 700 that comprise more or fewer steps than those described above, and/or one or more steps that are different than the steps described above.

Figure 8:
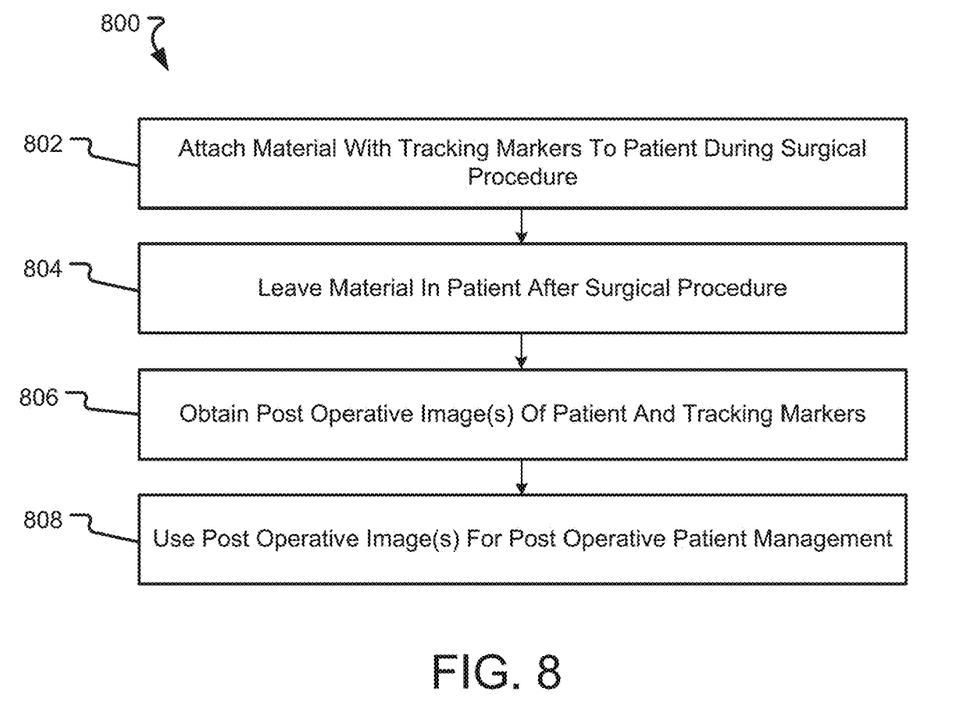
FIG. 8 is a flow diagram illustrating a method of using a flexible material for postoperative patient management according to embodiments of the present disclosure.

With reference now to FIG. 8, a method 800 of using a flexible material 204 for postoperative patient management will be described according to embodiments of the present disclosure. The method 800 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 800. The at least one processor may perform the method 800 by executing data stored in a memory such as the memory 106. The data (e.g., instructions or neural networks) may cause the processor to execute one or more of the image processing 120, object identification 122, tissue motion tracking 124, and/or reporting and feedback 126.

The method 800 begins by attaching a flexible material 204 with tracking markers 202 to a patient 300 or object of a patient 300 during a surgical procedure (step 802). The attachment process may be similar or identical to any one of the attachment processes described herein.

The method 800 may continue by leaving the flexible material 204 in the patient 300 such that the flexible material 204 remains in the patient 300 after the surgical procedure is competed (step 804). One or more images may then be obtained of the patient 300 postoperatively (step 806). The image(s) captured of the patient 300 may include images of the tracking markers 202 and the type of image(s) captured may depend upon the nature of the tracking markers 202 left in the patient 300.

The postoperative images and the location of tracking markers 202 in the postoperative images may be used to facilitate postoperative patient management (step 808). As an example, the locations of tracking markers 202 may be used to help track patient pain score, fusion rates in spinal procedures, and/or other types of patient postoperative processes.

The present disclosure encompasses embodiments of the method 800 that comprise more or fewer steps than those described above, and/or one or more steps that are different than the steps described above.

As noted above, the present disclosure encompasses methods with fewer than all of the steps identified in FIGS. 4-8 (and the corresponding description of the methods 400, 500, 600, 700, and 800), as well as methods that include additional steps beyond those identified in FIGS. 4-8 (and the corresponding description of the methods 400, 500, 600, 700, and 800. The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
attaching a flexible material, which comprises one or more tracking markers, to soft tissue internal to a patient, wherein the flexible material and the one or more tracking markers conform to a shape of the soft tissue and deform consistent with movement of the soft tissue;
obtaining a preoperative image of the soft tissue, wherein the preoperative image comprises the one or more tracking markers in an initial position;
obtaining a first intraoperative ultrasound image of the soft tissue, wherein the first intraoperative ultrasound image comprises the one or more tracking markers in a first position;
obtaining a second intraoperative ultrasound image of the soft tissue, wherein the second intraoperative ultrasound image comprises the one or more tracking markers in a second position;
determining a motion of the soft tissue based on a comparison of the one or more tracking markers in the first position in the first intraoperative ultrasound image with the one or more tracking markers in the second position in the second intraoperative ultrasound image;
determining that the motion of the soft tissue causes the soft tissue to move more than a threshold distance;
in response to determining that the soft tissue moves more than the threshold distance, issuing an alert;
registering the one or more tracking markers in the preoperative image with the one or more tracking markers in at least one of the first intraoperative ultrasound image and the second intraoperative ultrasound image;
updating the preoperative image based on the registration to reflect the motion in the preoperative image; and
adjusting a navigation plan for a surgical robot based on the updated preoperative image to avoid damaging the soft tissue.

2. The method of claim 1, wherein the preoperative image is a preoperative magnetic resonance imaging MRI image.

3. The method of claim 1, wherein the preoperative image is a preoperative computed tomography (CT) image.

4. The method of claim 1, further comprising:
determining a size of the soft tissue and/or the shape of the soft tissue; and
selecting the flexible material for the soft tissue based on determining the size of the soft tissue and/or the shape of the soft tissue.

5. The method of claim 4, wherein selecting the flexible material comprises selecting a pre-formed sheet of flexible material that comprises a size and/or shape that substantially accommodates the size of the soft tissue and/or the shape of the soft tissue.

6. The method of claim 4, wherein selecting the flexible material comprises cutting a sheet of flexible material to a size and/or shape that substantially accommodates the size of the soft tissue and/or the shape of the soft tissue.

7. The method of claim 1, wherein attaching the flexible material comprises connecting the flexible material to the soft tissue with one or more nano-hooks.

8. The method of claim 1, wherein attaching the flexible material comprises using at least one of a staple, suture, and glue to attach the flexible material to the soft tissue.

9. The method of claim 1, further comprising:
obtaining at least one postoperative image of the soft tissue, wherein the at least one postoperative image of the soft tissue comprises the one or more tracking markers in a third position; and
determining a postoperative motion of the soft tissue based on a comparison of the one or more tracking markers in the third position with the one or more tracking markers in the first position and/or the second position.

10. The method of claim 1, wherein the one or more tracking markers comprise a first type of tracking marker and a second type of tracking marker.

11. The method of claim 1, wherein the one or more tracking markers comprise a plurality of tracking markers distributed on the flexible material in an array.

12. The method of claim 11, wherein the array comprises a subset of the plurality of tracking markers having a distribution or density that is different from other ones of the plurality of tracking markers in the array.

13. The method of claim 1, wherein the flexible material comprises a transparent or semitransparent material.

14. The method of claim 1, wherein the flexible material comprises a bioabsorbable mesh.

15. The method of claim 1, wherein the flexible material comprises a membrane.

16. The method of claim 1, wherein the preoperative image is a fluoroscopic image, an infrared image, a visible light image, a radiation image, a nuclear medicine image, or a positron-emission tomography image.

17. A system, comprising:
a computing device, wherein the computing device comprises:
a processor; and
computer memory coupled with the processor and having data stored therein that, when executed by the processor, enables the processor to:
obtain a preoperative image of a soft tissue element internal to a patient, wherein the preoperative image comprises one or more tracking markers in an initial position, wherein the one or more tracking markers are attached to the soft tissue element via a flexible material, wherein the flexible material and the one or more tracking markers conform to a shape of the soft tissue element and deform consistent with movement of the soft tissue element;
obtain a first intraoperative ultrasound image of the soft tissue element, wherein the first intraoperative ultrasound image comprises the one or more tracking markers in a first position;
obtain a second intraoperative ultrasound image of the soft tissue element, wherein the second intraoperative ultrasound image comprises the one or more tracking markers in a second position;
determine a motion of the soft tissue element based on a comparison of the one or more tracking markers in the first position with the one or more tracking markers in the second position;
determine that the motion of the soft tissue element causes the soft tissue element to move more than a threshold distance;
in response to determining that the soft tissue element moves more than the threshold distance, issue an alert;
register the one or more tracking markers in the preoperative image with the one or more tracking markers in at least one of the first intraoperative ultrasound image and in the second intraoperative ultrasound image;
update the preoperative image based on the registration to reflect the motion in the preoperative image; and
adjust a navigation plan for a surgical robot based on the updated preoperative image to avoid damaging the soft tissue element.

18. The system of claim 17, wherein the one or more tracking markers comprise at least one of an active fiducial and a passive fiducial.

19. The system of claim 17, wherein the data stored in the computer memory comprises at least one of an instruction set and a neural network.

20. The system of claim 17, wherein the preoperative image is a magnetic resonance imaging (MRI) image or a computed tomography (CT) image.

21. A surgical system, comprising:
a robot configured to execute a robotic surgical plan; and
a computing device comprising:
a processor; and
computer memory coupled with the processor and having data stored therein that, when executed by the processor, enables the processor to:
obtain a preoperative image of soft tissue internal to a patient, wherein the preoperative image comprises one or more tracking markers in an initial position, wherein the one or more tracking markers are attached to the soft tissue via a flexible material, wherein the flexible material and the one or more tracking markers conform to a shape of the soft tissue and deform consistent with movement of the soft tissue;
obtain an intraoperative ultrasound image of the patient during a surgical procedure, wherein the intraoperative ultrasound image comprises the one or more tracking markers;
analyze the intraoperative ultrasound image and determine a position of the one or more tracking markers;
determine, based on the position of the one or more tracking markers, a motion of the soft tissue during the surgical procedure;
determine that the motion of the soft tissue causes the soft tissue to move more than a threshold distance;
in response to determining that the soft tissue of the patient has moved more than the threshold distance, issue an alert;
register the one or more tracking markers in the preoperative image with the one or more tracking markers in the intraoperative ultrasound image;
update the preoperative image based on the registration to reflect the motion in the preoperative image; and
adjust a navigation plan for the robot based on the updated preoperative image to avoid damaging the soft tissue.

* * * * *